United States Patent
Han et al.

(10) Patent No.: US 6,629,103 B1
(45) Date of Patent: Sep. 30, 2003

(54) METHOD FOR SECURELY PROVIDING A TEXT FILE FOR EXECUTION

(75) Inventors: Ching-Chih Jason Han, Fremont, CA (US); Huan-Hui Zhao, Fremont, CA (US); Tsung-Yen Eric Chen, Fremont, CA (US); Kuo-Chun Lee, Fremont, CA (US)

(73) Assignee: Oridus, Inc., Fremont, CA (US)

( * ) Notice: Subject to any disclaimer, the term of this patent is extended or adjusted under 35 U.S.C. 154(b) by 399 days.

(21) Appl. No.: 09/704,584

(22) Filed: Nov. 2, 2000

(51) Int. Cl.[7] .................................................. G06F 7/00
(52) U.S. Cl. ............................. 707/102; 707/9; 707/10; 707/100; 707/101
(58) Field of Search ................... 707/1–10, 100–104.1; 380/1, 23–25, 28–30, 42–43, 239; 713/189–190, 193

(56) References Cited

U.S. PATENT DOCUMENTS

| | | | | |
|---|---|---|---|---|
| 5,548,646 A | * | 8/1996 | Aziz et al. ................... 713/153 |
| 5,708,709 A | * | 1/1998 | Rose ............................ 705/59 |
| 5,995,102 A | * | 11/1999 | Rosen et al. ................. 345/856 |
| 6,052,780 A | * | 4/2000 | Glover ......................... 713/193 |
| 6,065,046 A | * | 5/2000 | Feinberg et al. ............. 709/216 |
| 6,169,805 B1 | * | 1/2001 | Dunn et al. .................. 380/277 |
| 6,173,406 B1 | * | 1/2001 | Wang et al. .................. 713/201 |
| 6,185,686 B1 | * | 2/2001 | Glover ......................... 713/190 |
| 6,192,407 B1 | * | 2/2001 | Smith et al. ................. 709/229 |
| 6,223,292 B1 | * | 4/2001 | Dean et al. .................. 713/202 |
| 6,272,470 B1 | * | 8/2001 | Teshima ......................... 705/3 |
| 6,311,058 B1 | * | 10/2001 | Wecker et al. ............... 455/418 |
| 6,317,783 B1 | * | 11/2001 | Freishtat et al. ............. 709/218 |
| 6,332,127 B1 | * | 12/2001 | Bandera et al. ............... 705/14 |
| 6,405,245 B1 | * | 6/2002 | Burson et al. ............... 709/217 |

\* cited by examiner

*Primary Examiner*—Greta Robinson
*Assistant Examiner*—Linh Black
(74) *Attorney, Agent, or Firm*—Victor H. Okumoto

(57) ABSTRACT

A method is described that is implemented by a server for securely providing a text file to a client for execution. The method includes providing an encrypted text file and a program facilitating execution of the encrypted text file to the client. Such providing may be over the Internet or using a computer readable medium such as compact disc. The provided program responds to a run command to decrypt the encrypted text file, and feed the decrypted text file to an interpreter for execution.

14 Claims, 3 Drawing Sheets

METHOD FOR SECURELY PROVIDING A TEXT FILE FOR EXECUTION

FIELD OF THE INVENTION

The present invention generally relates to text files and in particular, to a method for securely providing a text file for execution.

BACKGROUND OF THE INVENTION

Commercial software programs are generally sold in binary executable form to protect their code from being copied by others. However, a software program written as a text file in a scripting language such as Perl, JavaScript or Tcl/Tk is hard to prevent from being read by others since such files are written and executed in plain text (ASCII) format. Therefore, if a software vendor desires to sell such text files as commercial products, the vendor must somehow protect the text file from being read by the end user.

OBJECTS AND SUMMARY OF THE INVENTION

Accordingly, it is an object of the present invention to provide a method for securely providing a text file for execution.

This and additional objects are accomplished by the various aspects of the present invention, wherein briefly stated, one aspect of the invention is a method for securely providing a text file for execution, comprising: providing an encrypted text file; and providing a program for generating a decrypted text file by decrypting the encrypted text file, and feeding the decrypted text file to an interpreter for execution.

Another aspect of the invention is a computer readable medium storing binary information comprising: an encrypted text file; and a program for generating a decrypted text file by decrypting the encrypted text file and feeding the decrypted text file to an interpreter for execution.

Additional objects, features and advantages of the various aspects of the present invention will become apparent from the following description of its preferred embodiment, which description should be taken in conjunction with the accompanying drawing.

DETAILED DESCRIPTION OF THE PREFERRED EMBODIMENT

Figure 1:
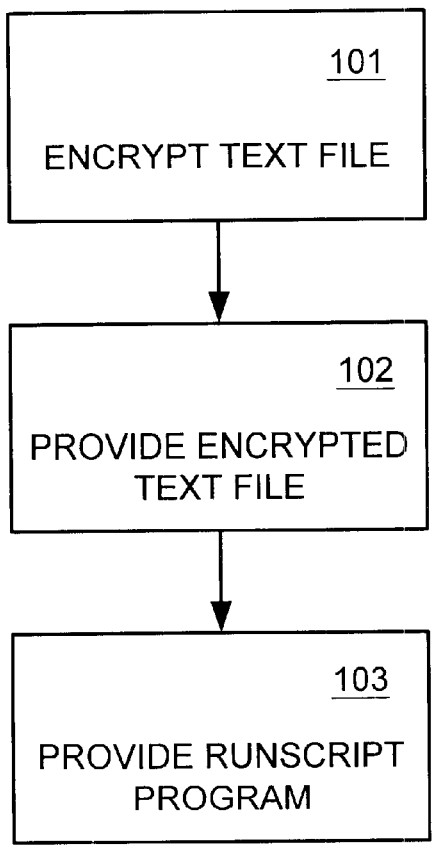
FIG. 1 illustrates a flow diagram of a method for securely providing a text file for execution.

FIG. 1 illustrates a flow diagram of a method 100 for securely providing a text file for execution. The text file is written in Perl script in this example, and is executed by a Perl interpreter. Text files written in other script languages such as JavaScript and Tcl/Tk are also contemplated, and considered to be within the full scope of the present invention.

In 101, a server (e.g., 301, 401) encrypts the text file (e.g., 305, 405) by executing an encryption program (e.g., 306, 406) that generates an encrypted text file (e.g., 307, 407). Encryption may be performed by any one of many well-known techniques. In 102, the server provides the encrypted text file to a client (e.g., 302, 402), and in 103, the server also provides a program (e.g., 308, 408) to the client for facilitating execution of the encrypted text file. The order that the encrypted text file and program are provided to the client is not important. The providing of the encrypted text file and program to the client may employ various well-known means including transmitting them to the client over the Internet (e.g., 303) or distributing them to the client on a computer readable medium such as a compact disc or "CD" (e.g., 403).

Figure 2:
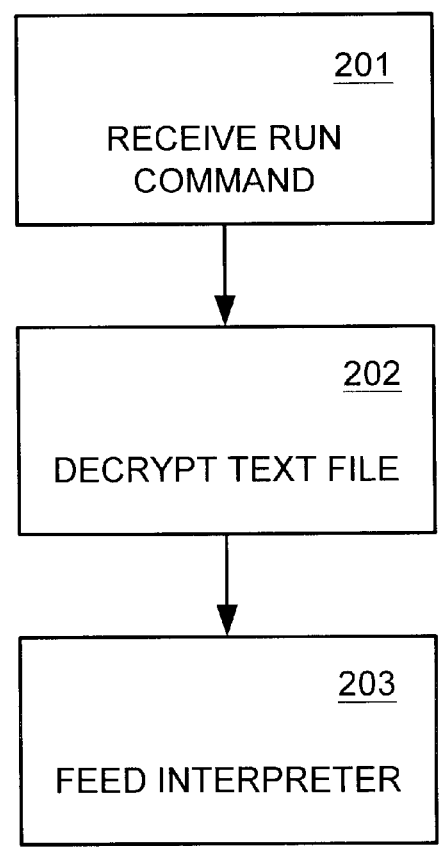
FIG. 2 illustrates a flow diagram of a program for facilitating execution of an encrypted text file.

FIG. 2 illustrates a flow diagram of the program (e.g., 308, 408) for facilitating execution of the encrypted text file (e.g., 307, 407). The program is in binary executable form. It is written in the C++ computer language in this example, and is referred to herein as the "runscript" program. The "runscript" program runs on the client (e.g., 302, 402) for facilitating execution of the encrypted text file on the client.

In 201, the program receives a "run" command. In response to the "run" command, in 202, the program generates a decrypted text file by decrypting the encrypted text file, and in 203, the program feeds the decrypted text file to an interpreter for execution. The decrypted text file is stored in the address space of the "runscript" program, which is only known to the "runscript" program itself.

Thus, since the text file provided to the client is encrypted, a user on the client side cannot readily read the encrypted text file. Further, since the "runscript" program is in binary executable form, a user on the client side cannot easily locate the decrypted text file since its location is only known to the "runscript" program and it is only transiently stored in the address space of the "runscript" program during execution of the text file on the client.

Figure 3:
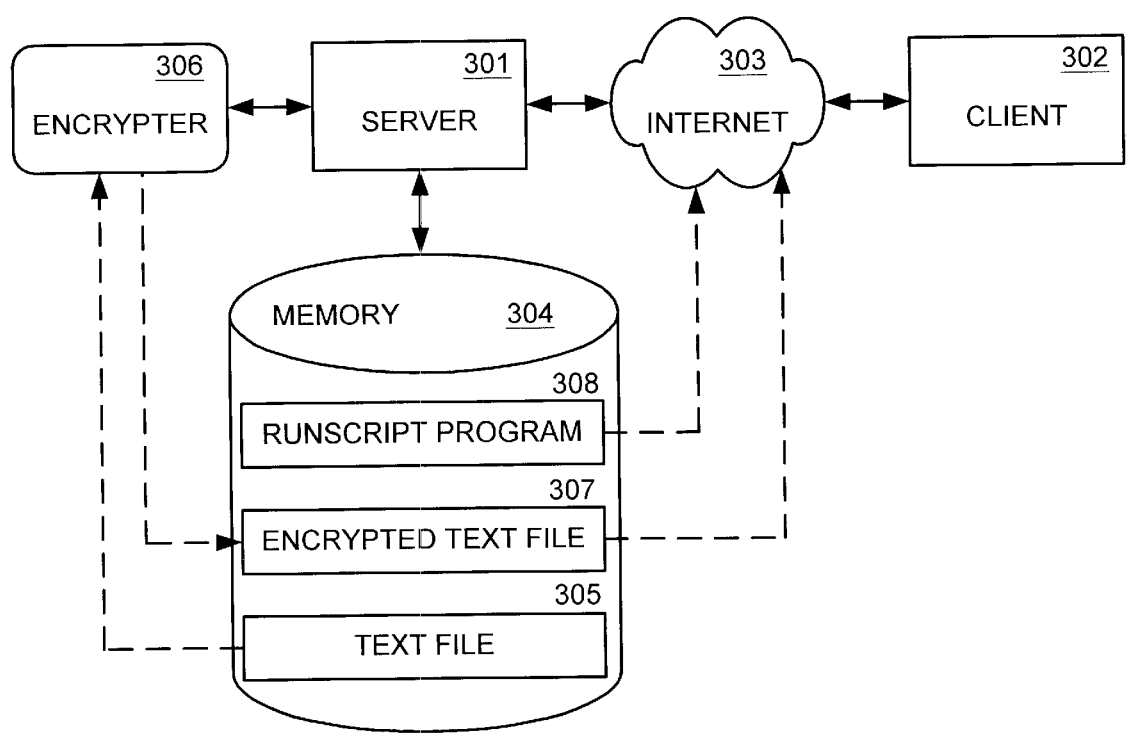
FIG. 3 illustrates a block diagram of a system for securely providing a text file over the Internet.

FIG. 3 illustrates a block diagram of a system for securely providing a text file over the Internet 303. The system includes a server 301 having a memory 304. The memory 304 stores the text file 305. The memory 304 also stores the "runscript" program 308 described by example in reference to FIG. 2. As depicted by dotted lines on the left side of the memory 304, the server 301 runs an encryption program 306 that encrypts the text file 305 to generate an encrypted text file 307, and stores the encrypted text file 307 in the memory 304 along with the text file 305 and "runscript" program 308. Subsequently, as depicted by dotted lines on the right side of the memory 304, in response to a download request from a client 302, the server 301 transmits copies of the encrypted text file 307 and the "runscript" program 308 to the client 302 over the Internet 303, and the client 302 stores them for later execution.

When the text file is written in JavaScript, a slightly different procedure is involved. In this case, the encrypted JavaScript may be embedded in a web page downloaded by the client 302 from the server 301. The client 302 also downloads the "runscript" program from the server 301 as a plug-in for its web browser. Consequently, when the web browser of the client 302 encounters the encrypted JavaScript in the downloaded web page, it first calls up the "runscript" plug-in to decrypt the encrypted JavaScript, and then it interprets the decrypted JavaScript provided by the "runscript" plug-in.

Figure 4:
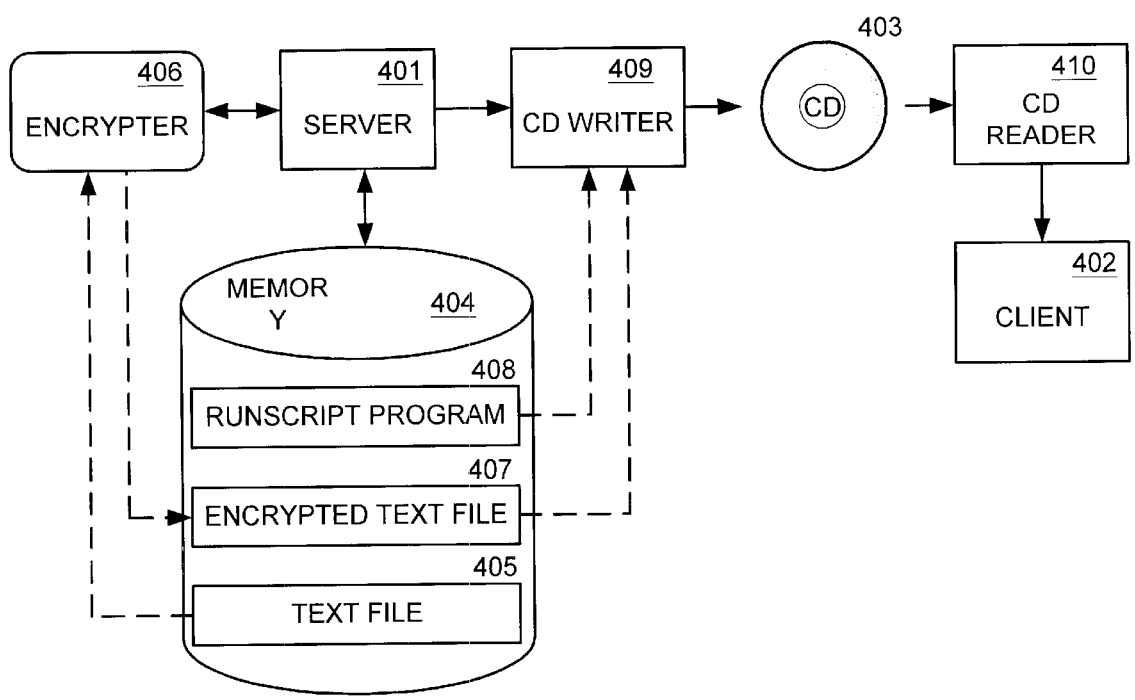
FIG. 4 illustrates a block diagram of a system for securely providing a text file on a computer readable medium.

FIG. 4 illustrates a block diagram of a system for securely providing a text file on a computer readable medium 403. The system includes a server 401 having a memory 404 and a CD writer 409. The memory 404 stores the text file 405.

The memory 404 also stores the "runscript" program 408 described by example in reference to FIG. 2. As depicted by dotted lines on the left side of the memory 404, the server 401 runs an encryption program 406 that encrypts the text file 405 to generate an encrypted text file 407, and stores the encrypted text file 407 in the memory 404 along with the text file 405 and "runscript" program 408. As depicted by dotted lines on the right side of the memory 404, the server 301 causes the CD writer 409 to write the encrypted text file 407 and the "runscript" program 408 onto a CD 403. The CD 403 is then provided to the client 402. A CD reader 410 of the client 402 reads the encrypted text file 407 and "runscript" program 408 off the CD 403, and the client 402 stores them for later execution.

Although the various aspects of the present invention have been described with respect to a preferred embodiment, it will be understood that the invention is entitled to full protection within the full scope of the appended claims.

We claim:

1. A method for securely providing a text file for execution, comprising:

providing an encrypted text file; and providing a program for generating a decrypted text file by decrypting said encrypted text file, and feeding said decrypted text to an interpreter for execution, while transiently storing said decrypted text file during said execution in a location only known to said program.

2. The method according to claim 1, wherein said text file is a script.

3. The method according to claim 2, wherein said script is a Perl script and said interpreter is a Perl interpreter.

4. The method according to claim 2, wherein said script is in JavaScript and said interpreter is a web browser.

5. The method according to claim 1, wherein said encrypted text file and said program are provided by transmitting said encrypted text file and said program to a client computer over the Internet.

6. The method according to claim 1, wherein said encrypted text file and said program are stored on a computer readable medium to facilitate providing said encrypted text file and said program.

7. A computer readable medium storing binary information comprising:

an encrypted text file; and a program for generating a decrypted text file by decrypting said encrypted text file and feeding said decrypted text file to an interpreter for execution, while transiently storing said decrypted text file during said execution in a location only known to said program.

8. The computer readable medium according to claim 7, wherein said text file is a script.

9. The computer readable medium according to claim 8, wherein said script is a Perl script and said interpreter is a Perl interpreter.

10. The computer readable medium according to claim 8, wherein said script is in JavaScript and said interpreter is a web browser.

11. A computer implemented method for executing an encrypted text file comprising running a program for generating a decrypted text file by decrypting an encrypted text file, transiently storing said decrypted text file in a location only known to said program, and feeding said decrypted text file to an interpreter for execution.

12. The computer implemented method according to claim 11, wherein said text file is a script.

13. The computer implemented method according to claim 12, wherein said script is a Perl script and said interpreter is a Perl interpreter.

14. The computer implemented method according to claim 12, wherein said script is in JavaScript and said interpreter is a web browser.

* * * * *